US009063850B2

(12) United States Patent
Hyvonen et al.

(10) Patent No.: US 9,063,850 B2
(45) Date of Patent: Jun. 23, 2015

(54) EXTENDED UTILIZATION AREA FOR A MEMORY DEVICE

(71) Applicant: Memory Technologies LLC, Kirkland, WA (US)

(72) Inventors: Jani Hyvonen, Tampere (FI); Kimmo J. Mylly, Kirkland (FI); Jussi Hakkinen, Tampere (FI); Yevgen Gyl, Tampere (FI)

(73) Assignee: Memory Technologies LLC, Las Vegas, NV (US)

( * ) Notice: Subject to any disclaimer, the term of this patent is extended or adjusted under 35 U.S.C. 154(b) by 0 days.

(21) Appl. No.: 13/951,169

(22) Filed: Jul. 25, 2013

(65) Prior Publication Data

US 2013/0332691 A1    Dec. 12, 2013

Related U.S. Application Data

(63) Continuation of application No. 12/039,672, filed on Feb. 28, 2008, now Pat. No. 8,307,180, and a continuation of application No. 13/645,588, filed on Oct. 5, 2012.

(51) Int. Cl.
*G06F 12/00* (2006.01)
*G06F 12/06* (2006.01)
(Continued)

(52) U.S. Cl.
CPC .......... *G06F 12/0646* (2013.01); *G06F 21/79* (2013.01); *G06F 12/1441* (2013.01); *G06F 12/1433* (2013.01); *G06F 12/1458* (2013.01);
(Continued)

(58) Field of Classification Search
CPC .. G06F 21/79; G06F 12/1441; G06F 12/1433

USPC ......................................... 711/163
See application file for complete search history.

(56) References Cited

U.S. PATENT DOCUMENTS 5,586,291 A   12/1996   Lasker et al.
5,802,069 A    9/1998   Coulson
(Continued)

FOREIGN PATENT DOCUMENTS

AU   2005200855   9/2004
EP      1763036   3/2007
(Continued)

OTHER PUBLICATIONS

The Chinese Office Action mailed Apr. 9, 2013 for Chinese patent application No. 200980106241.1, a counterpart foreign application of US patent No. 8,307,180, 4 pages.
(Continued)

*Primary Examiner* — Yong Choe
(74) *Attorney, Agent, or Firm* — Lee & Hayes, PLLC (57) ABSTRACT

Methods, systems and devices for configuring access to a memory device are disclosed. The configuration of the memory device may be carried out by creating a plurality of access profiles that are adapted to optimize access to the memory device in accordance with a type of access. For example, when an application with specific memory access needs is initiated, the memory access profile that is designed for that particular access need may be utilized to configure access to the memory device. The configuration may apply to a portion of the memory device, a partition of the memory device, a single access location on the memory device, or any combination thereof.

54 Claims, 5 Drawing Sheets

(51) Int. Cl.
  *G06F 13/16* (2006.01)
  *G06F 21/79* (2013.01)
  *G06F 12/14* (2006.01)

(52) U.S. Cl.
  CPC ......... *G06F 13/1694* (2013.01); *Y02B 60/1225* (2013.01); *Y02B 60/1228* (2013.01)

(56) References Cited

U.S. PATENT DOCUMENTS

| | | | |
|---|---|---|---|
| 5,809,340 | A | 9/1998 | Bertone et al. |
| 6,373,768 | B2 | 4/2002 | Woo et al. |
| 6,480,936 | B1 | 11/2002 | Ban et al. |
| 6,513,094 | B1 | 1/2003 | Magro |
| 6,522,586 | B2 | 2/2003 | Wong |
| 6,665,747 | B1 | 12/2003 | Nazari |
| 6,785,764 | B1 | 8/2004 | Roohparvar |
| 6,842,829 | B1 | 1/2005 | Nichols et al. |
| 7,136,963 | B2 | 11/2006 | Ogawa et al. |
| 7,181,574 | B1 | 2/2007 | Lele |
| 7,233,538 | B1 | 6/2007 | Wu et al. |
| 7,321,958 | B2 | 1/2008 | Hofstee et al. |
| 7,395,176 | B2 | 7/2008 | Chung et al. |
| 7,450,456 | B2 | 11/2008 | Jain et al. |
| 7,480,749 | B1 | 1/2009 | Danilak |
| 7,571,295 | B2 | 8/2009 | Sakarda et al. |
| 7,697,311 | B2 | 4/2010 | Fukuda et al. |
| 7,760,569 | B2 | 7/2010 | Ruf et al. |
| 7,809,962 | B2 | 10/2010 | Chang et al. |
| 8,190,803 | B2 | 5/2012 | Hobson et al. |
| 8,218,137 | B2 | 7/2012 | Noh et al. |
| 8,321,713 | B2 | 11/2012 | Nobunaga |
| 2002/0087817 | A1* | 7/2002 | Tomaiuolo et al. ............ 711/157 |
| 2002/0108014 | A1 | 8/2002 | Lasser |
| 2003/0137860 | A1 | 7/2003 | Khatri et al. |
| 2004/0010671 | A1 | 1/2004 | Sampsa et al. |
| 2004/0049692 | A1 | 3/2004 | Okamoto |
| 2004/0203670 | A1 | 10/2004 | King et al. |
| 2004/0221124 | A1 | 11/2004 | Beckert et al. |
| 2005/0010738 | A1 | 1/2005 | Stockdale et al. |
| 2005/0071570 | A1 | 3/2005 | Takasugl et al. |
| 2005/0204113 | A1 | 9/2005 | Harper et al. |
| 2006/0041888 | A1 | 2/2006 | Radulescu et al. |
| 2006/0069899 | A1 | 3/2006 | Schoinas et al. |
| 2006/0075147 | A1 | 4/2006 | Schoinas et al. |
| 2006/0075395 | A1 | 4/2006 | Lee et al. |
| 2006/0174056 | A1 | 8/2006 | Lambert et al. |
| 2006/0179212 | A1 | 8/2006 | Kim et al. |
| 2006/0184758 | A1 | 8/2006 | Satori et al. |
| 2006/0280077 | A1* | 12/2006 | Suwa ........................ 369/47.24 |
| 2007/0088867 | A1 | 4/2007 | Cho et al. |
| 2007/0234006 | A1 | 10/2007 | Radulescu et al. |
| 2007/0283078 | A1 | 12/2007 | Li et al. |
| 2008/0080688 | A1* | 4/2008 | Burgan et al. ............ 379/142.04 |
| 2008/0127131 | A1 | 5/2008 | Gao et al. |
| 2008/0162792 | A1 | 7/2008 | Wu et al. |
| 2008/0183954 | A1 | 7/2008 | Lee et al. |
| 2008/0228984 | A1 | 9/2008 | Yu et al. |
| 2008/0244173 | A1 | 10/2008 | Takai |
| 2008/0281944 | A1 | 11/2008 | Vorne et al. |
| 2008/0282030 | A1 | 11/2008 | Kalwitz et al. |
| 2009/0106503 | A1 | 4/2009 | Lee et al. |
| 2009/0157950 | A1 | 6/2009 | Selinger |
| 2009/0182940 | A1 | 7/2009 | Matsuda et al. |
| 2009/0182962 | A1 | 7/2009 | Khmelnitsky et al. |
| 2009/0198871 | A1 | 8/2009 | Tzeng |
| 2009/0198872 | A1 | 8/2009 | Tzeng |
| 2009/0216937 | A1 | 8/2009 | Yasufuku |
| 2009/0222629 | A1 | 9/2009 | Yano et al. |
| 2009/0307377 | A1 | 12/2009 | Anderson et al. |
| 2009/0313420 | A1 | 12/2009 | Wiesz et al. |
| 2009/0327584 | A1 | 12/2009 | Tetrick et al. |
| 2010/0005281 | A1 | 1/2010 | Buchmann et al. |
| 2010/0037012 | A1 | 2/2010 | Yano et al. |
| 2010/0100648 | A1 | 4/2010 | Madukkarumukumana et al. |
| 2010/0106886 | A1 | 4/2010 | Marcu et al. |
| 2010/0106901 | A1 | 4/2010 | Higeta et al. |
| 2010/0115193 | A1 | 5/2010 | Manus et al. |
| 2010/0161882 | A1 | 6/2010 | Stern et al. |
| 2010/0169558 | A1 | 7/2010 | Honda et al. |
| 2010/0169604 | A1 | 7/2010 | Trika et al. |
| 2010/0172180 | A1 | 7/2010 | Paley et al. |
| 2010/0250836 | A1 | 9/2010 | Sokolov et al. |
| 2010/0293420 | A1 | 11/2010 | Kapil et al. |
| 2010/0312947 | A1 | 12/2010 | Luukkainen et al. |
| 2011/0082967 | A1 | 4/2011 | Deshkar et al. |
| 2011/0087804 | A1 | 4/2011 | Okaue et al. |
| 2011/0264860 | A1 | 10/2011 | Hooker et al. |
| 2011/0296088 | A1 | 12/2011 | Duzly et al. |
| 2012/0079171 | A1 | 3/2012 | Ju et al. |
| 2012/0102268 | A1 | 4/2012 | Smith et al. |
| 2012/0131263 | A1 | 5/2012 | Yeh |
| 2012/0131269 | A1 | 5/2012 | Fisher et al. |
| 2012/0210326 | A1 | 8/2012 | Torr et al. |
| 2013/0007348 | A1 | 1/2013 | Fai et al. |
| 2013/0138840 | A1 | 5/2013 | Kegel et al. |
| 2013/0145055 | A1 | 6/2013 | Kegel et al. |

FOREIGN PATENT DOCUMENTS

| | | |
|---|---|---|
| JP | 10228413 | 8/1998 |
| JP | 11143643 A | 5/1999 |
| JP | 2000003309 A | 1/2000 |
| JP | 2003015949 A | 1/2003 |
| JP | 2004021669 | 1/2004 |
| JP | 2006195569 | 7/2006 |
| JP | 2006221627 | 8/2006 |
| JP | 2000779724 | 3/2007 |
| JP | 2007115382 | 5/2007 |
| JP | 2007518166 | 7/2007 |
| KR | 20060082040 A | 7/2006 |
| WO | WO99/65193 | 12/1999 |
| WO | WO2004084231 | 9/2004 |
| WO | WO2005088468 | 6/2005 |
| WO | WO2005066773 A1 | 7/2005 |
| WO | WO2012021380 A2 | 2/2012 |

OTHER PUBLICATIONS

European Search Report for Application No. 09715221.9, dated Oct. 25, 2011, pages.
JEDEC Standard, "Embedded MultiMediaCard (eMMC) Mechanical Standard," JESD84-C43, Jun. 2007, 14 pages.
The Japanese Office Action mailed Jan. 16, 2013 for Japanese patent application No. 2010548134, a counterpart foreign application of US patent No. 8,307,180, 6 pages.
Lin et al., "A NAND Flash Memory Controller for SDIMMC Flash Memory Card," IEEE 2007, pp. 933-935.
Numonyz, "How to boot an embedded system from an eMMCTM equipped with a Microsoft FAT file system." Application note AN2539, Nov. 2008, pp. 1-25.
International Search Report for PCT Application No. PCT/FI2009/050083 dated Jun. 3, 2009, pages.
Standard, "Embedded ZmultiMediaCard(eMMC) eMMC/Card Product Standard, high Capacity, Including Reliable Write, Boot, and Sleep Modes," (MMCA, 4.3), JSEDD84-A43, Nov. 2007, 166 pages.
The Japanese Office Action mailed Nov. 25, 2013 for Japanese patent application No. 2013-103695, a counterpart foreign application of US patent No. 8,307,180, 8 pages.
Japanese Search Report for Application No. 2010-548134, mailed on May 10, 2012, 11 pages.
English translation of Office Action for Korean Patent Application No. 10-2010-7021534, dated Sep. 30, 2011, 2 pages.
Translation of Communication from Foreign Patent Office, Decision of Rejection, JP Application No. 2010-548134, mailed Jan. 16, 2013, 3 pages.
The Japanese Office Action mailed Aug. 27, 2013 for Japanese patent application No. 2010548134, a counterpart foreign application of US patent application No. 8,307,180, 4 pages.
Office action for U.S. Appl. No. 12/455,763, mailed on Aug. 1, 2013, Luukkainen et al., "Apparatus and method to share host system ram with mass storage memory ram," 28 pages.

(56) References Cited

OTHER PUBLICATIONS

U.S. Appl. No. 13/358,806, filed Jan. 26, 2012, Mylly et al., "Apparatus and Method to Provide Cache Move with Non-Volatile Mass Memory System," 45 pages.

The Korean Office Action mailed Mar. 3, 2014 for Korean patent application No. 2013-7002338, a counterpart foreign application of US patent No. 8,307,180, 5 pages.

Office Action for U.S. Appl. No. 13/451,951, mailed on Jan. 7, 2014, Kimmo J. Mylly, "Managing Operational State Data in Memory Module," 24 pages.

Office Action for U.S. Appl. No. 12/455,763, mailed on Mar. 14, 2014, Luukkainen et al., "Apparatus and method to share host system ram with mass storage memory ram," 6 pages.

The PCT Search Report and Written Opinion mailed Sep. 5, 2013 for PCT application No. PCT/US13/37298, 9 pages.

Apostolakis, et al., "Software-Based Self Testing of Symmetric Shared-Memory Multiprocessors", IEEE Transactions on Computers, vol. 58, No. 12, Dec. 2009, 13 pages.

"Embedded MultiMediaCard (eMMC) Mechanical Standard", JESD84-C43, JEDEC Standard, JEDEC Solid State Technology Association, Jun. 2007, 13 pages.

"How to Boot an Embedded System for an eMMC Equipped with a Microsoft FAT File System", AN2539 Numonyx Application Note, Nov. 2008, 25 pages.

The Japanese Office Action mailed Jan. 7, 2015 for Japanese patent application No. 2013-103695, a counterpart foreign application of US patent No. 8,307,180, 8 pages.

Li, et al., "A Method for Improving Concurrent Write Performance by Dynamic Mapping Virtual Storage System Combined with Cache Management", 2011 IEEE 7th International Conference of Parallel Distributed System, Dec. 7-8, 2011, 10 pages.

Office Action for U.S. Appl. No. 13/358,806, mailed on Nov. 27, 2013, Kimmo J. Mylly, "Apparatus and Method to Provide Cache Move With Non-Volatile Mass Memory System", 26 pages.

Office Action for U.S. Appl. No. 13/596,480, mailed on Mar. 13, 2014, Kimmo J. Mylly, "Dynamic Central Cache Memory", 15 pages.

Final Office Action for U.S. Appl. No. 13/358,806, mailed on Sep. 10, 2014, Kimmo J. Mylly, "Apparatus and Method to Provide Cache Move With Non-Volatile Mass Memory System", 27 pages.

The PCT Search Report and Written Opinion mailed Mar. 6, 2014 for PCT application No. PCT/US13/56980, 11 pages.

Tanenbaum, "Structured Computer Organization", Prentice-Hall, Inc, 1984, 5 pages.

JEDEC Standard, "Embedded MultiMediaCard (eMMC) Product Standard, High Capacity," JESD84-A42, Jun. 2007, 29 pages.

The Chinese Office Action mailed Aug. 27, 2014 for Chinese patent application No. 200980106241.1, a counterpart foreign application of US patent No. 8,307,180, 3 pages.

Final Office Action for U.S. Appl. No. 13/451,951, mailed on Dec. 4, 2014, Kimmo J. Mylly, "Managing Operational State Data of a Memory Module Using Host Memory in Association with State Change", 24 pages.

Office Action for U.S. Appl. No. 14/520,030, mailed on Dec. 4, 2014, Olli Luukkainen, "Apparatus and Method to Share Host System RAM with Mass Storage Memory RAM", 6 pages.

\* cited by examiner

EXTENDED UTILIZATION AREA FOR A MEMORY DEVICE

This application is a continuation of and claims priority to U.S. patent application Ser. No. 13/645,588, filed Dec. 5, 2012, which was a continuation of U.S. patent application Ser. No. 12/039,672, filed Feb. 28, 2008, both of which are incorporated herein by reference.

FIELD OF INVENTION

The present invention relates generally to memory devices. In particular, the present invention relates to providing systems, methods and devices for run-time configuration of mass memory devices.

BACKGROUND OF THE INVENTION

In a typical environment involving digital data processing and/or data communications, memory devices are invoked for a variety of reasons, for example, to read, write, modify, delete, or change the attributes of the data that resides on a memory device. These operations (hereinafter referred to as memory 'access' operations) may be targeted to access varying chunks of data according to the needs of an application program that invokes the specific memory access operation. For example, an application may require access to a small chunk of data from random addresses, the same address, or sequential addresses on the memory device. Similarly, the same or a different application may require access to large chunks of data from random addresses, the same address, or sequential addresses on the memory device. Examples of the different applications that may access a memory device include file systems, different databases, kernel reading code pages, and other applications that use the memory device.

It is often the case that a mass memory device is optimized for one kind of application, or a defined group of applications, with particular memory access characteristics. This optimization, for example, may entail optimization of data throughput, life time and/or power consumption associated with the memory device. Due to this fixed optimization strategy, when a memory device is placed into a different environment with new access demands, it may fail to optimally perform under the requirements of the new environment. The lack of flexibility in optimizing such memory devices may be partly due to inherent limitations that render these memory devices incapable of accommodating optimized functionalities for multiple kinds of access operations. In other cases, however, the reason for electing to a memory device for a defined, and thus limited, group of applications is to simplify the design, and to effect cost savings. In addition, it is generally very difficult for a memory device to predict access requirements that are necessitated by yet-to-be determined future application needs.

SUMMARY OF THE INVENTION

A method, system and memory device are therefore provided to overcome the deficiencies of the prior art systems by allowing run-time configuration of a mass memory device. In one embodiment of the present invention a method for configuring access to a memory device is provided. The method comprises receiving one or more commands for activating one or more access profiles associated with the memory device, and configuring access to the memory device in accordance with at least one of the access profiles. The access profiles may correspond to at least one of a random and a sequential mode of access. The access profiles may further correspond to at least one of a read, a write, an erase, and a modify attribute operation.

In another embodiment of the present invention, one or more access profiles are adapted to accommodate repeated access requests to an identical address of the memory device. In another embodiment, one or more access profiles are adapted to produce an optimized performance associated with the memory device. Furthermore, the performance may be optimized in accordance with at least one of: data throughput, lifetime, and power consumption associated with the memory device.

In another embodiment of the present invention, one or more received commands comprise a metadata portion for designating a preferred access profile corresponding to the command. Furthermore, a specific memory location may be utilized in accordance with the access profile. In one embodiment, the specific memory location may comprise a section of the memory device with special characteristics. For example, it may include a more durable and performance-effective portion of the physical memory, or a portion of the memory that utilizes a specific memory technology. In another embodiment, the specific memory location may comprise a separate physical memory chip.

In another embodiment of the present invention, one or more access profiles are associated with one or more partitions of the memory device. Yet, in another embodiment, the configuring of the memory device is adapted in parallel for two or more parallel access profiles. In one embodiment, such configuring is carried out in accordance with JESD84 standard for eMMC. This configuring may further comprise designating access priority levels to resolve simultaneous access conflicts to memory resources. In another embodiment of the present invention, the memory device is used to effect both mass memory and system memory implementations. In another embodiment, a default access profile may be used to configure the memory device upon power up.

Another aspect of the present invention relates to a memory device that comprises one or more registers for storing one or more predefined access profiles associated with the memory device. The memory device also comprises receiving means for receiving one or more commands for activating one or more access profiles associated with the memory device, and configuring means for configuring access to the memory device in accordance with at least one of the predefined access profiles. In another embodiment, a currently active access profile may reside in a designated memory register. In another embodiment, one or more of the predefined access profiles may be updated with a new version of the access profile.

In another embodiment of the present invention, a computer program product embodied on a computer-readable medium is disclosed. The computer program product comprises a computer code for receiving one or more commands for activating one or more access profiles associated with the memory device, and a computer code for configuring access to the memory device in accordance with at least one of the access profiles. In another embodiment, a system for accessing a memory device is disclosed. The system comprises an entity for receiving one or more commands for activating one or more access types associated with the memory device, and an entity for configuring access to the memory device in accordance with at least one of the access profiles. In another embodiment, a system for accessing a memory device is disclosed. The system comprises a host for issuing one or more commands in accordance with access needs for the memory device, and an entity for receiving the commands and configuring access to the memory device in accordance with at least one or more access profiles.

Those skilled in the art will appreciate that various embodiments discussed above, or parts thereof, may be combined in a variety of ways to create further embodiments that are encompassed by the present invention.

DETAILED DESCRIPTION OF VARIOUS EMBODIMENTS

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions.

The problem of configuring a memory device for use in different environments has been traditionally addressed by using separate memory devices in systems with different use cases. For example, a system may utilize a mass memory device separate from a system memory device to accommodate different memory access demands.

The various embodiments of the present invention disclose methods, systems and devices to enable run-time configuration of a memory device in accordance with certain memory access profiles. The configuration may be effected for a portion of the memory device, a partition of the memory device, or even one single access location on the memory device. Since the system that accesses the memory device knows, or is capable of determining, the type of memory access needs (e.g., whether it is a read, write, erase, modify attribute, random, or a sequential operation), it can issue commands for configuring the memory device in accordance with an access profile that is most optimized/suitable for the particular access command. Such access profiles, for example, may be adapted for optimizing data throughput, lifetime and/or power consumption associated with particular uses of the memory device. In addition, according to the embodiments of the present invention, a default access profile may be defined to configure a memory device when, for example, the device or system initially boots up. Such a default profile, while providing a starting point for potential future modifications, may be pre-selected to accommodate the most likely access needs for that memory device. This profile may remain in effect until the memory device is powered down, or it may be replaced by another profile in accordance with the embodiments of the present invention.

In accordance with embodiments of the present invention, the information regarding the nature and type of memory access allows the memory device to organize itself in a manner that is most suited for a particular access command, resulting in improved performance and higher reliability. These improvements are largely due to the elimination of background operations and unnecessary data merging that are normally associated with traditional memory access methods. Although effective in both the random and sequential memory access modes, the techniques of the various embodiments of the present invention may be more effective in optimizing sequential memory access operations, where background processing and data merging are more abundant. These optimizations further extend the life of the storage device, and result in reduced energy consumption by the device.

The embodiments of the present invention further enable the utilization of the same memory device both as the mass storage memory and the system memory, thus eliminating the need for separate memory devices that are utilized in the systems of prior art. For example, all non-volatile memory needs of a system may be accommodated using a single eMMC memory, where the Operating System image, user data, and other parameters may be stored on the same device. Similarly, in multimedia applications that require very high density mass storage devices (e.g., in the order of several Gigabytes), the very same memory device may be used to store the various types of user applications, the Operating System and other system data files. This consolidation is expected to further spur the adoption of a standardized memory device with higher production volumes, and to eventually lead to lower-cost memory devices. The advent of such cost-effective, single-memory devices are particularly beneficial to the development of mobile devices in which size and cost constraints are most significant.

Figure 5:
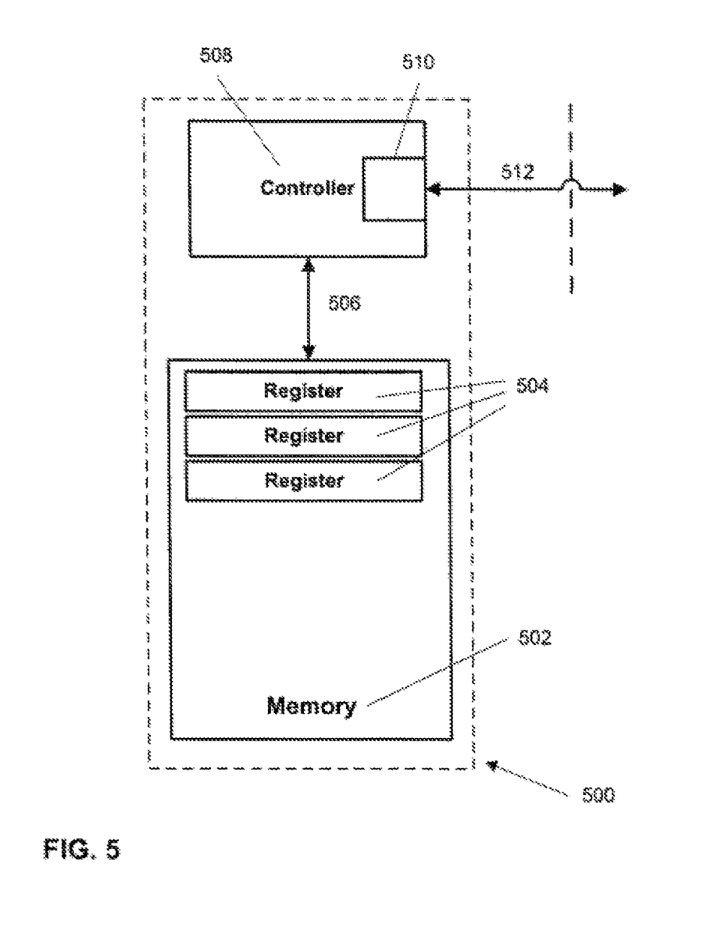
FIG. 5 illustrates an exemplary device in accordance with an embodiment of the present invention.

In accordance with one embodiment of the present invention, as illustrated in FIG. 5, a memory device 500 may comprise a physical memory 502 with one or more registers 504 for accommodating the predefined access profiles that are used to optimize the memory device. The memory device 500 may further comprise a receiving means 510 that is adapted to receive one or more commands, through the communication interface 512, for activating a particular access profile. To facilitate understanding of the present embodiment, the receiving means 510 is illustrated as comprising a separate section of the controller 508. However, it is understood that the receiving means 510 and the controller 508 may also be implemented as a single entity. Upon the receipt of one or more commands, the controller 508 may configure the memory device 500 in accordance with one or more access profiles that reside in memory registers 504. The communication between the controller 508 and the physical memory 502 may be conducted through the interface 506.

By the way of example, and not limitation, one predefined access profile may be a burst mode profile that facilitates high-speed transfer of large data chunks and provides a 'ready' indication to the host prior to, or after, such transfer. In order to minimize the transfer time, the needed flash memory management operations may take place subsequent to the transfer at a convenient time, for example, while no other activities or memory access operations are taking place. Another example of an access profile includes a random mode profile which enables quick access to short, random memory locations on the device. The memory device in accordance with embodiments of the present invention may further comprise another register for accommodating the currently active access profile. This profile, which may be any one of the supported predefined profiles, governs the current access operations to the memory device. For example, such register may comprise a default profile that is activated during the boot up of the host system and/or the power up of the memory device. This active profile may remain in effect until the memory device is powered down, or it may be replaced by another profile in accordance with the embodiments of the present invention. Run-time configurability of the memory device in accordance with the present invention is effected by replacing the contents of the currently active profile register with one of the predefined profiles that resides on the first set of registers. Accordingly, when the need for a new type of memory access arises, a command may be issued to activate a suitable profile. The command may activate any one of the predefined access profiles, including but not limited to, the default profile.

In accordance with another embodiment, the various access profiles may be updated or uploaded onto the memory device. For example, an existing access profile may be augmented (or completely replaced with a new version) to add or remove certain features and functionalities. Alternatively, or additionally, an entirely new access profile may be uploaded to the memory device, thus increasing the number of available access profiles that can be readily used to configure the memory device. By the way of example, and not by limitation, an access profile may be implemented as a binary file that further comprises the required logic to implement an access profile. This way, the access profile may be considered part of the memory device firmware responsible for handling specific accesses needs in an optimized fashion.

Figure 1:
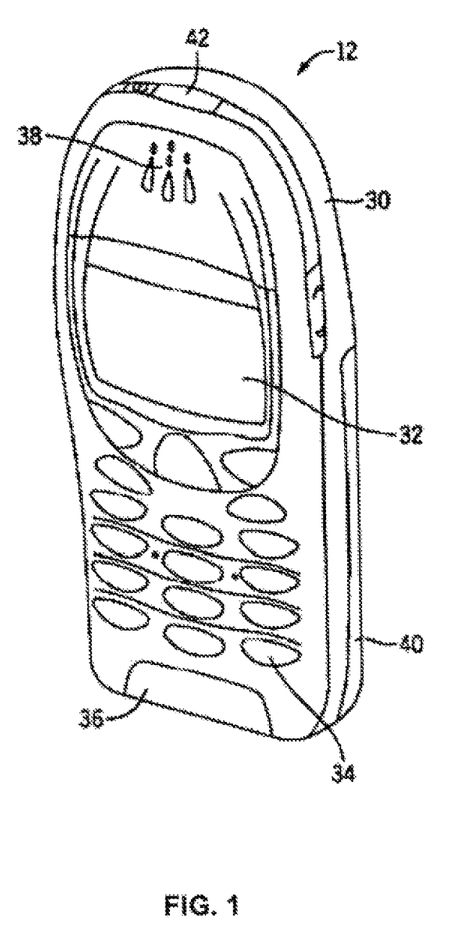
FIG. 1 illustrates a perspective view of an exemplary electronic device within which various embodiments of the present invention may be implemented.
Figure 2:
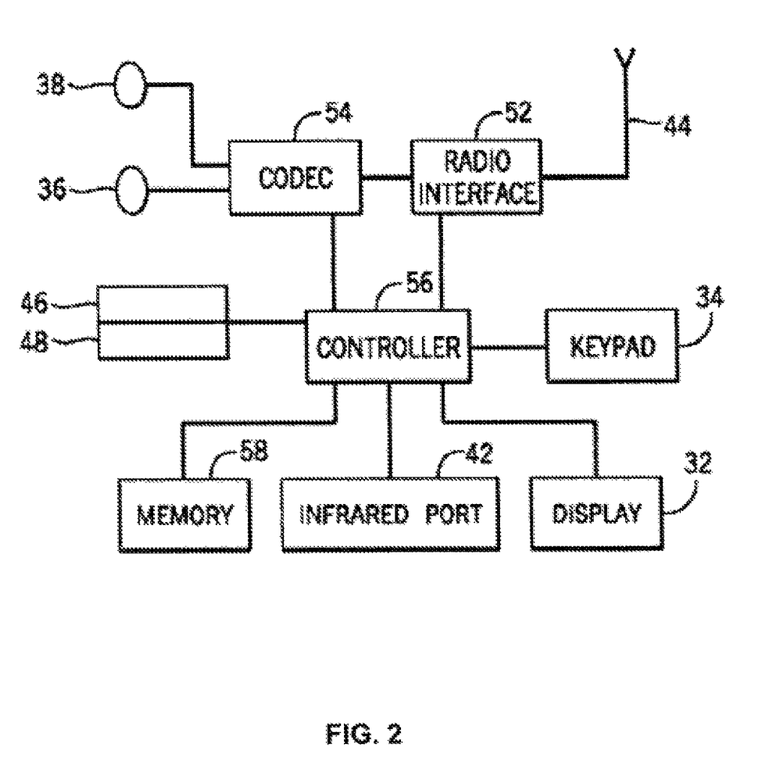
FIG. 2 illustrates an exemplary schematic representation of the circuitry which may be included in the electronic device of FIG. 1.

FIGS. 1 and 2 show one representative electronic device 12 within which embodiments of the present invention may be implemented. It should be understood, however, that the present invention is not intended to be limited to one particular type of device. In fact, the various embodiments of the present invention may be readily adapted for use in any stand-alone or embedded system that comprises or accesses a memory device. The electronic device 12 of FIGS. 1 and 2 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. Individual circuits and elements are all of a type well known in the art, for example in the Nokia range of mobile telephones.

Figure 3:
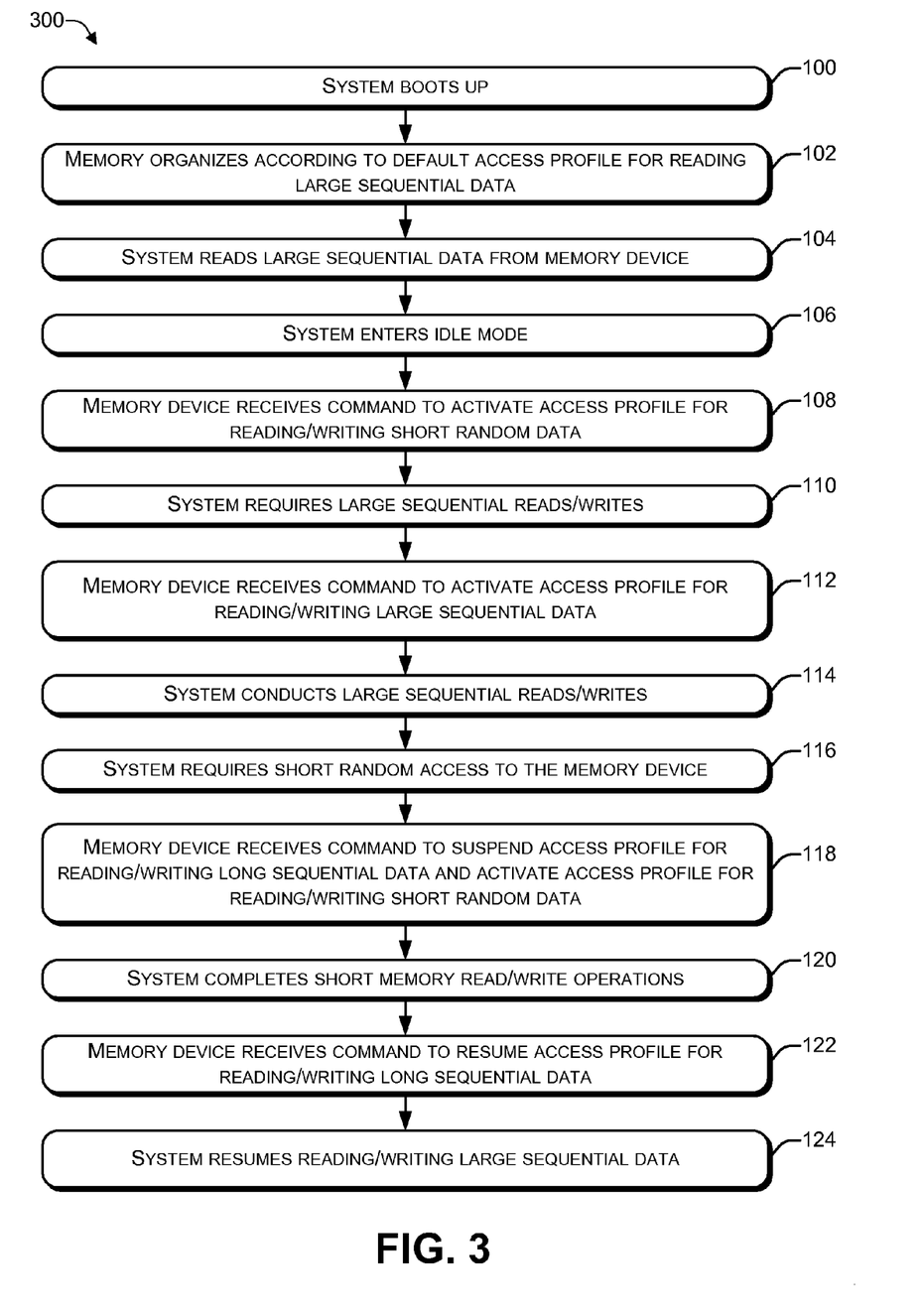
FIG. 3 illustrates a flow diagram of an exemplary embodiment of the present invention.

FIG. 3 is an example flow diagram illustrating run-time configurability of a memory device in accordance to an embodiment of the present invention. As illustrated in FIG. 3, upon boot up of the system in step 100, the memory device in accordance with embodiments of the present invention organizes itself according to the default profile in step 102. The exemplary default profile used in FIG. 3 configures the memory device to accommodate the reading of large sequential data from the memory device. In step 104, the system reads a large amount of sequential data, which for example, may comprise the operating system of the host device. Upon completion of the large read operation, the system enters an idle state in step 106. Since the majority of memory access operations during an idle state is likely to involve short random read/write operations, the memory device, in step 108, is commanded to activate an access profile for reading/writing short random data. In Step 110, the system requires large sequential reads/writes. By the way of example, and not by limitation, this need may arise when the system is connected to an external mass storage device. Such a mass storage device may, for example, include a stand-alone memory device such as a USB memory, or a PC or other electronic device that comprises one or more mass storage components. In anticipation of large data transfers to/from the external memory device, the memory device in accordance with embodiments of the present invention, in step 112, receives a command to activate the access profile that is optimized for reading/writing large sequential data. In step 114, the system conducts at least a portion of the large sequential read/write transfer. While the large data access operations may be completed without further interruptions, in one exemplary embodiment, the system of the present invention may need to access the memory device in short, random I/O access cycles, as illustrated in step 116. In accordance with one embodiment of the present invention, in step 118, the memory device may receive a command to suspend its current access profile, which is directed towards reading/writing long sequential data, and activate an alternate access profile that is optimized for reading/writing short random data. Once the system completes short memory access operations in step 120, the memory device, in step 122, may receive a subsequent command to revert back to the access profile for reading/writing large sequential data. The system may then resume reading/writing large sequential data in step 124.

Figure 4:
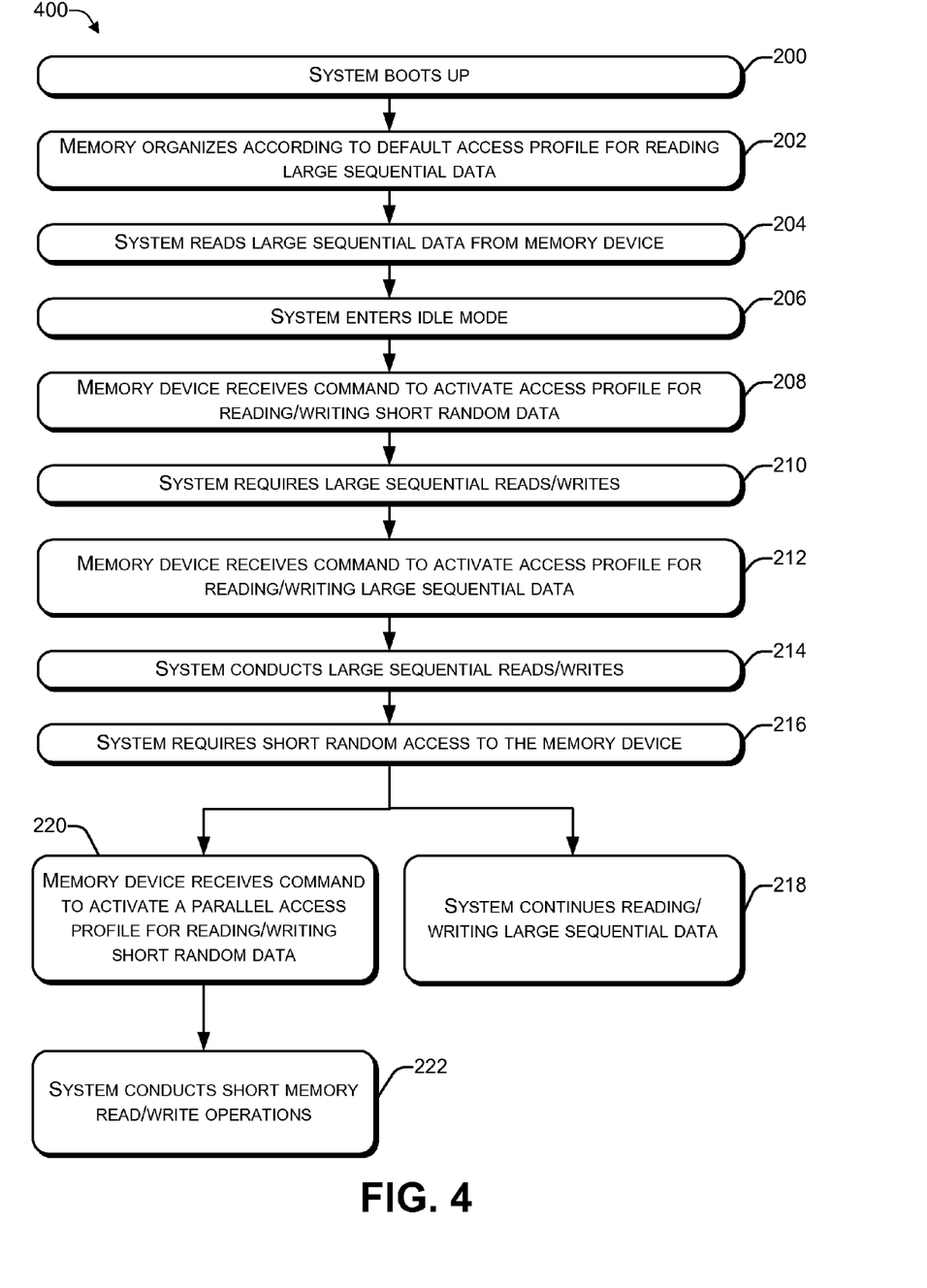
FIG. 4 illustrates a flow diagram of another exemplary embodiment of the present invention.

As describe above, the example embodiment of the present invention as illustrated in FIG. 3 suspends the large data transfer while conducting short I/O access operations. However, in some applications, it may be advantageous to conduct two or more memory access operations in parallel. To this end, FIG. 4, illustrates an alternate embodiment of the present invention according to which two or more memory access operations (and their corresponding access profiles) may be implemented in parallel. In FIG. 4, steps 200 to 216 represent similar operations as their counterparts in FIG. 3. Specifically, upon boot up in step 200, the memory device in accordance with embodiments of the present invention organizes itself according to the default profile in step 202. The exemplary default profile used in FIG. 4 configures the memory device to accommodate the reading of large sequential data from the memory device. In step 204, the system reads a large amount of sequential data, which for example, may comprise the operating system of the host device. Upon completion of the large read operation, the system enters an idle state in step 206. Since the majority of memory access operations during an idle state is likely to involve short random read/write operations, the memory device, in step 208, is commanded to activate an access profile for reading/writing short random data. The system may then require access to large sequential reads/writes in step 210. This need may arise, for example, in preparation for large data transfers to/from an external memory device. The memory device in accordance with embodiments of the present invention, in step 212, receives a command to activate the access profile that is optimized for reading/writing large sequential data. In step 214, the system conducts at least a portion of the large sequential read/write transfers before the system need for short read/write access cycles to the memory device arises in step 216. In contrast to the example embodiment of the present invention in accordance with FIG. 3, the present embodiment in accordance with FIG. 4 accommodates both memory access modes by commanding the memory device in accordance with embodiments of the present invention to activate a parallel access profile for reading/writing short random data in step 220. Accordingly, while the system continues to read/write large sequential data in step 218, it may simultaneously (or in an interleaved fashion) conduct short memory access operations in step 222.

While the embodiment of the present invention in accordance with FIG. 4 was described in terms of only two simultaneous access profiles, it is understood that similar operations may be carried out to allow the implementation of more than two access profiles in parallel. One specific parallel implementation of memory access profiles may be realized in a format that is compatible with the current JEDEC JC64 eMMC version 4.3 (JESD84). JEDEC eMMC is a standardized mass storage device comprising a memory and a controller device. The controller handles block-management functions associated with the memory such as logical block allocation and wear leveling. The communication between the memory and the host device is also handled by the controller according to a standard protocol. This protocol defines, among other signals, a bidirectional command signal, CMD, that is used for device initialization, and transfer of commands between the host and memory device. More specifically, CMD23 (SET_BLOCK_COUNT) defines the number of blocks (read/write) and the reliable writer parameter (write) for a block read/write command. CMD23 includes a 32 bit argument field, of which bits 15 to 0 are allocated for setting the number of blocks for the corresponding read/write command, and bits 30 to 16 are designated as stuff bits. In accordance to one embodiment of the present invention, these stuff bits may be utilized to designate different access profiles for the memory device. By the way of example, and not by limitation, one profile may be defined as a burst profile mode, corresponding to a fast, contiguous data access mode.

When in burst profile mode, the memory device, immediately after receiving all the data, may indicate "exit busy" and set the transfer mode to "transfer state," thus facilitating faster execution of subsequent accesses by the host. In addition, while the commands corresponding to the first access profile are still being executed, the memory device may also enable the host to send additional commands corresponding to a different access profile. This way, a degree of parallelism in the I/O operations is established. Furthermore, access priority levels may be defined to resolve access conflicts, where two or more profiles run in parallel and require access to the same memory resource at the same time. Examples of such a memory resources include a RAM buffer, a Flash bus, and other memory resources.

In accordance with another embodiment of the present invention, the access profile associated with a media device may be adapted to comprise different control and/or setting profiles that are associated with different partitions of the memory device. Such partitions may comprise logical or physical partitions of the memory device. For example, one partition may be configured for random read/write operations while another partition may be configured to provide sequential access.

In accordance with another embodiment of the present invention, a memory access (e.g., an I/O read/write) command may be configured to comprise a metadata portion for designating a preferred access profile corresponding to that access command. For example, the system in accordance with the present invention may recognize that one address is being continuously and frequently updated, and accordingly, it may set an appropriate access profile for that memory command. The memory device—depending on its internal implementations and capabilities—may map such sustained and specific access operations to certain sections of the physical memory with special characteristics. For example, the mapping may be directed to a more a more durable and performance-effective portion of the physical memory, a portion of the memory that utilizes a specific memory technology, or to a separate physical chip that is more suitably designed for such repeated access operations. Thus, the memory device firmware may take an action in accordance with the access profile request of an embodiment of the present invention and handle the 110 operation in a different way.

The various embodiments of the present invention are equally applicable to both the embedded memory devices, such as NAND, mass memory, XiP, and similar devices, as well as to removable memory cards.

The various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A memory device comprising:
   one or more registers to store one or more predefined access profiles associated with the memory device, the one or more predefined access profiles used to determine how access to the memory device is configured for at least one usage; and
   a controller configured to:
      receive at least one first command to activate at least one of the one or more predefined access profiles; and
      receive at least one second command to designate the at least one of the one or more predefined access profiles such that at least a portion of the memory device is configured according to the at least one of the one or more predefined access profiles for the at least one usage.

2. The memory device of claim 1, wherein the at least one first command activates two or more of the predetermined access profiles in parallel.

3. The memory device of claim 1, wherein at least one of the one or more predefined access profiles comprises a default access profile.

4. The memory device of claim 1, wherein the memory device comprises an embedded MultiMedia Card (eMMC) device.

5. The memory device of claim 1, wherein the controller is configured to conduct two or more simultaneous memory access operations.

6. The memory device of claim 5, wherein the controller is configured to assign access priority levels to resolve conflicting simultaneous memory access operations.

7. The memory device of claim 1, wherein the controller is configured to interleave two or more simultaneous memory access operations.

8. The memory device of claim 7, wherein the controller is configured to assign access priority levels to resolve conflicting interleaved memory access operations.

9. The memory device of claim 1, wherein the one or more registers comprise a plurality of registers for storing a plurality of the predefined access profiles.

10. A memory device comprising:
one or more predefined access profiles to determine how access to the memory device is configured for at least one usage of the memory device;
a controller configured to:
receive at least one first command to activate at least one of the one or more predefined access profiles associated with the memory device; and
receive at least one second command to configure access to the memory device in accordance with the at least one of the one or more predefined access profiles such that at least a portion of the memory device is configured according to the at least one of the one or more predefined access profiles for the at least one usage.

11. The memory device of claim 10, wherein the at least one first command activates two or more access profiles in parallel.

12. The memory device of claim 10, wherein at least one of the one or more predefined access profiles comprises a default access profile.

13. The memory device of claim 10, wherein the memory device comprises an embedded MultiMedia Card (eMMC) device.

14. The memory device of claim 10, wherein the controller is configured to conduct two or more simultaneous memory access operations.

15. The memory device of claim 14, wherein the controller is configured to assign access priority levels to resolve conflicting simultaneous memory access operations.

16. The memory device of claim 10, wherein the controller is configured to interleave two or more simultaneous memory access operations.

17. The memory device of claim 16, wherein the controller is configured to assign access priority levels to resolve conflicting interleaved memory access operations.

18. The memory device of claim 10, wherein the one or more predefined access profiles comprise a plurality of predefined access profiles.

19. A method comprising:
receiving at least one first command to activate at least one of one or more predefined access profiles associated with a memory device, the one or more predefined access profiles stored in one or more registers, the one or more predefined access profiles determining how access to the memory device is configured for at least one usage of the memory device; and
receiving at least one second command to designate the at least one of the one or more predefined access profiles such that at least a portion of the memory device is configured according to the at least one of the one or more predefined access profiles for the at least one usage.

20. The method of claim 19, wherein receiving the at least one first command activates two or more access profiles in parallel.

21. The method of claim 19, wherein at least one of the one or more predefined access profiles comprises a default access profile.

22. The method of claim 19, wherein the memory device comprises an embedded MultiMedia Card (eMMC) device.

23. The method of claim 19, further comprising performing two or more memory access operations simultaneously.

24. The method of claim 23, further comprising assigning access priority levels to resolve conflicting simultaneous memory access operations.

25. The method of claim 19, further comprising interleaving two or more simultaneous memory access operations.

26. The method of claim 25, further comprising assigning access priority levels to resolve conflicting interleaved memory access operations.

27. The method of claim 19, wherein the one or more registers comprise a plurality of registers for storing a plurality of the predefined access profiles.

28. A method comprising:
receiving at least one first command to activate at least one of one or more predefined access profiles associated with a memory device, the one or more predefined access profiles determining how access to the memory device is configured for at least one usage of the memory device; and
receiving at least one second command to configure access to the memory device in accordance with the at least one of the one or more predefined access profiles such that at least a portion of the memory device is configured according to the one or more predefined access profiles for the at least one usage.

29. The method of claim 28, wherein receiving the at least one first command activates two or more access profiles in parallel.

30. The method of claim 28, wherein at least one of the one or more predefined access profiles comprises a default access profile.

31. The method of claim 28, wherein the memory device comprises an embedded MultiMedia Card (eMMC) device.

32. The method of claim 28, further comprising performing two or more memory access operations simultaneously.

33. The method of claim 32, further comprising assigning access priority levels to resolve conflicting simultaneous memory access operations.

34. The method of claim 28, further comprising interleaving two or more simultaneous memory access operations.

35. The method of claim 34, further comprising assigning access priority levels to resolve conflicting interleaved memory access operations.

36. The method of claim 28, wherein the one or more predefined access profiles comprise a plurality of predefined access profiles.

37. A host device, comprising:
an interface to couple the host device to a memory device; and
a controller configured with logic instructions to perform acts comprising:
sending at least one first command from the host device to the memory device, the at least one first command to activate at least one of one or more predefined access profiles associated with the memory device, the one or more predefined access profiles stored in one or more registers of the memory device, the one or more predefined access profiles determining how access to the memory device is configured for at least one usage of the memory device; and sending at least one second command to designate the at least one of the one or more predefined access profiles such that at least a portion of the memory device is configured according to the at least one of the one or more predefined access profiles for the at least one usage.

38. The host device of claim 37, wherein sending the at least one first command activates two or more access profiles in parallel.

39. The host device of claim 37, wherein at least one of the one or more predefined access profiles comprises a default access profile.

40. The host device of claim 37, wherein the memory device comprises an embedded MultiMedia Card (eMMC) device.

41. The host device of claim 37, wherein at least one of the one or more predefined access profiles configures the memory device to perform two or more memory access operations simultaneously.

42. The host device of claim 41, wherein at least one of the one or more predefined access profiles configures the memory device to assign access priority levels to resolve conflicting simultaneous memory access operations.

43. The host device of claim 37, wherein at least one of the one or more predefined access profiles configures the memory device to interleave two or more simultaneous memory access operations.

44. The host device of claim 43, wherein at least one of the one or more predefined access profiles configures the memory device to assign access priority levels to resolve conflicting interleaved memory access operations.

45. The host device of claim 37, wherein the one or more registers comprise a plurality of registers for storing a plurality of the predefined access profiles.

46. A host device, comprising:
an interface to couple the host device to a memory device; and
a controller configured with logic instructions to perform acts comprising:
sending at least one first command from the host device to a memory device that is connected to the host device, the at least one first command to activate at least one of one or more predefined access profiles associated with the memory device, the one or more predefined access profiles determining how access to the memory device is configured for at least one usage of the memory device; and
sending at least one second command to configure access to the memory device in accordance with the at least one of the one or more predefined access profiles such that at least a portion of the memory device is configured according to the at least one of the one or more predefined access profiles for the at least one usage.

47. The host device of claim 46, wherein sending the at least one first command activates two or more access profiles in parallel.

48. The host device of claim 46, wherein at least one of the one or more predefined access profiles comprises a default access profile.

49. The host device of claim 46, wherein the memory device comprises an embedded MultiMedia Card (eMMC) device.

50. The host device of claim 46, wherein at least one of the one or more predefined access profiles configures the memory device to perform two or more memory access operations simultaneously.

51. The host device of claim 50, wherein at least one of the one or more predefined access profiles configures the memory device to assign access priority levels to resolve conflicting simultaneous memory access operations.

52. The host device of claim 46, wherein at least one of the one or more predefined access profiles configures the memory device to interleave two or more simultaneous memory access operations.

53. The host device of claim 52, wherein at least one of the one or more predefined access profiles configures the memory device to assign access priority levels to resolve conflicting interleaved memory access operations.

54. The host device of claim 46, wherein the one or more predefined access profiles comprise a plurality of predefined access profiles.

* * * * *